United States Patent
Lee et al.

(10) Patent No.: US 10,952,048 B2
(45) Date of Patent: Mar. 16, 2021

(54) VEHICLE WIRELESS CONNECTION SYSTEM AND METHOD OF CONTROLLING THE SAME

(71) Applicants: Hyundai Motor Company, Seoul (KR); Kia Motors Corporation, Seoul (KR)

(72) Inventors: Hyun Woo Lee, Gyeonggi-do (KR); Hye Won You, Seoul (KR); Min Hyuk Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/664,092

(22) Filed: Oct. 25, 2019

(65) Prior Publication Data

US 2020/0344583 A1   Oct. 29, 2020

(30) Foreign Application Priority Data

Apr. 25, 2019   (KR) ........................ 10-2019-0048350

(51) Int. Cl.
| | |
|---|---|
| *H04W 76/10* | (2018.01) |
| *H04W 4/48* | (2018.01) |
| *H04W 4/80* | (2018.01) |
| *H04L 29/12* | (2006.01) |
| *H04W 84/12* | (2009.01) |

(52) U.S. Cl.
CPC ........... *H04W 4/48* (2018.02); *H04L 61/6022* (2013.01); *H04W 4/80* (2018.02); *H04W 76/10* (2018.02); *H04W 84/12* (2013.01)

(58) Field of Classification Search
CPC ......... H04W 4/48; H04W 76/10; H04W 4/80; H04W 84/12; H04W 4/02; H04W 76/11; H04L 61/6022; H04B 3/544; H04B 3/18558

See application file for complete search history.

(56) References Cited

U.S. PATENT DOCUMENTS

| | | | |
|---|---|---|---|
| 9,147,344 B2 * | 9/2015 | Nagy ................... | G07B 15/063 |
| 2014/0079217 A1 * | 3/2014 | Bai ...................... | H04L 63/0869 |
| | | | 380/270 |
| 2014/0129301 A1 * | 5/2014 | Van Wiemeersch ... | G07B 15/02 |
| | | | 705/13 |
| 2014/0342756 A1 * | 11/2014 | Houri ................... | H04W 4/021 |
| | | | 455/456.2 |
| 2016/0156638 A1 * | 6/2016 | Somani ................ | H04W 12/12 |
| | | | 726/7 |

(Continued)

*Primary Examiner* — Andrew Wendell

(74) *Attorney, Agent, or Firm* — Mintz Levin Cohn Ferris Glovsky and Popeo, P.C.; Peter F. Corless

(57) ABSTRACT

A vehicular wireless connection system and method are provided to perform wireless communication connection between a vehicle and a smart device of a user. The method includes receiving a plurality of beacon signals by the smart device and generating a positioning key based on at least some of the plurality of beacon signals. Identification information including the positioning key and identification information of at least one nearby wireless device is transmitted to a server. In response to receiving vehicle verification result information from the server, a wireless connection to the vehicle is attempted based on the vehicle verification result information.

12 Claims, 5 Drawing Sheets

(56) References Cited

U.S. PATENT DOCUMENTS

| | | | |
|---|---|---|---|
| 2017/0052538 A1* | 2/2017 | Li | B60N 2/0248 |
| 2018/0087921 A1* | 3/2018 | Suzuki | G06Q 20/389 |
| 2018/0302742 A1* | 10/2018 | Yasuda | H04W 4/48 |
| 2019/0028850 A1* | 1/2019 | Yamaguchi | H04W 12/06 |
| 2019/0270429 A1* | 9/2019 | Peeters | G02B 5/30 |
| 2019/0331503 A1* | 10/2019 | Yoneda | G01C 21/3438 |

* cited by examiner

VEHICLE WIRELESS CONNECTION SYSTEM AND METHOD OF CONTROLLING THE SAME

CROSS-REFERENCE TO RELATED APPLICATION(S)

This application claims the benefit of Korean Patent Application No. 10-2019-0048350, filed on Apr. 25, 2019, which is hereby incorporated by reference as if fully set forth herein.

BACKGROUND

Field of the Invention

The present invention relates to a vehicular wireless connection system and a method of controlling the same, and more particularly, to a vehicular wireless connection system that performs wireless communication connection between a vehicle and a smart device of a user.

Discussion of the Related Art

A driver who first uses a new vehicle, due to a new purchase, a car-sharing service, a car rental, or the like has difficulty performing a wireless connection procedure for a connectivity service such as Bluetooth (BT), Wi-Fi, or telematics. In particular, such a pairing process may be unfamiliar to some users. In addition, it is cumbersome to directly search for unique information of a vehicle and to manually input the information to use a connected-car service or a car-sharing application.

SUMMARY

Accordingly, the present invention provides a vehicular wireless connection system and a method of controlling the same for more conveniently supporting connection with a smart device. In particular, an object of the present invention is to provide a vehicular wireless connection system and a method of controlling the same, which acquire information required to connect a smart device to a vehicle and omit the requirement of a manual user input.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with the purpose of the invention, as embodied and broadly described herein, a wireless connection method of a smart device may include receiving a plurality of beacon signals by the smart device, generating a positioning key based on at least some of the plurality of beacon signals, transmitting identification information including the positioning key and identification information of at least one nearby wireless device, to a server, and upon receiving vehicle verification result information from the server, attempting wireless connection to the vehicle based on the vehicle verification result information.

In another aspect of the present invention, a method of supporting wireless communication connection between a smart device and a vehicle including a preset number of beacons, by a server may include receiving vehicle identification information including a positioning key generated based on a signal transmitted by one of the plurality of beacons and identification information of at least one wireless device, from the smart device, verifying the vehicle based on the positioning key and the identification information of the at least one wireless device, and transmitting vehicle verification result information as a result of the verifying to the smart device.

In another aspect of the present invention, a vehicular wireless communication connection system may include a vehicle having a preset number of beacons and at least one wireless communication module, and a smart device configured to attempt wireless connection to the vehicle using a plurality of beacon signals and wireless device identification information received from the at least one wireless communication module. The smart device may be configured to generate a positioning key based on at least some of the plurality of beacon signals and transmit identification information of at least one nearby wireless device, to a server. Upon receiving vehicle verification result information from the server, the smart device may be configured to attempt wireless connection to the vehicle based on the vehicle verification result information.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
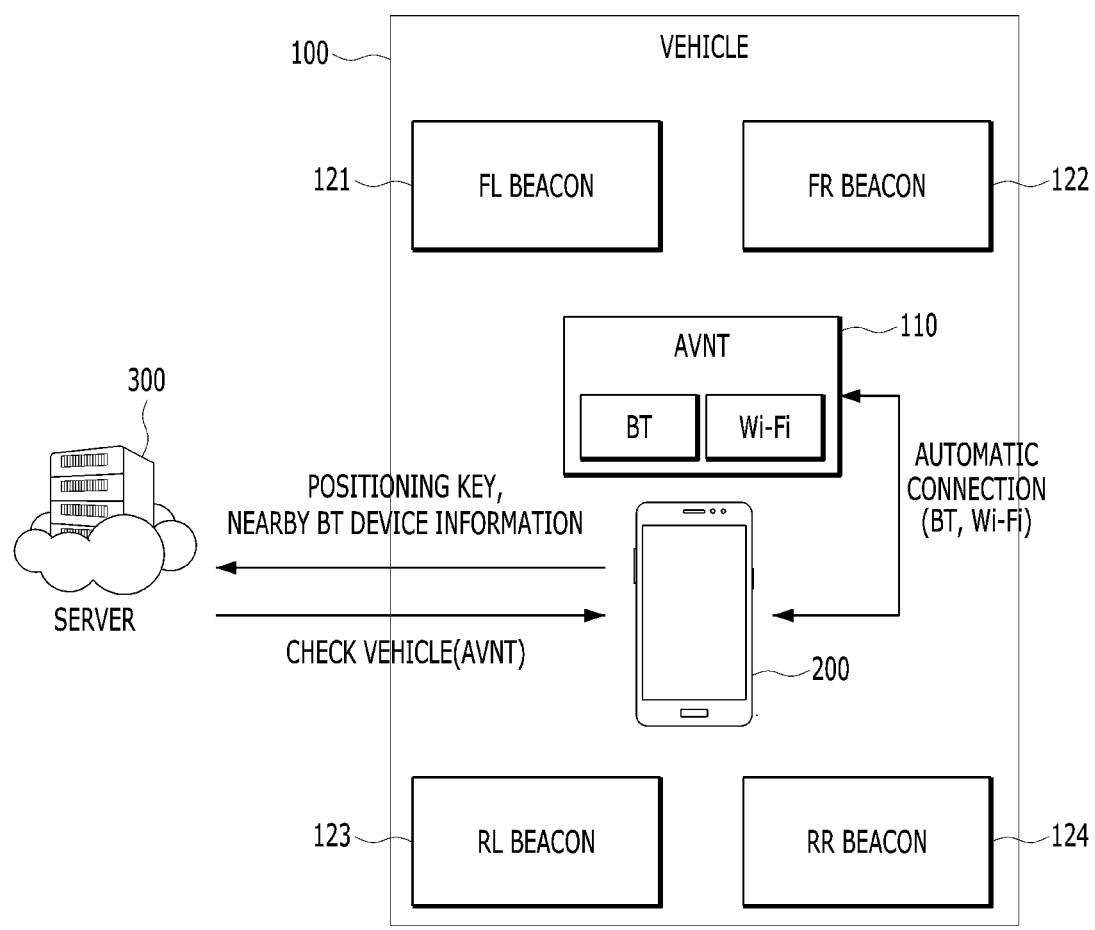
FIG. 1 is a schematic diagram showing a configuration of a vehicular wireless connection system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. Notably, the controller may be specifically programmed to execute the processes.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described in detail so as for those of ordinary skill in the art to easily implement with reference to the accompanying drawings. However, the present invention may be implemented in various different forms and is not limited to these exemplary embodiments. To clearly describe the present invention, a part without concerning to the description is omitted in the drawings, and like reference numerals in the specification denote like elements.

According to proposals of an exemplary embodiment of the present invention, whether a smart device is positioned within a vehicle may be determined based on a signal received from a plurality of beacons installed within a vehicle. Information regarding a connectable wireless device along with beacon signal information may be transmitted to a server when the smart device is determined to be positioned within the vehicle. A wireless device of the vehicle, which matches a beacon signal based on the information acquired by the server, may be verified, and the smart device may be configured to automatically establish a wireless connection with the corresponding vehicle when the smart device is notified of information regarding the wireless device.

Figure 2:
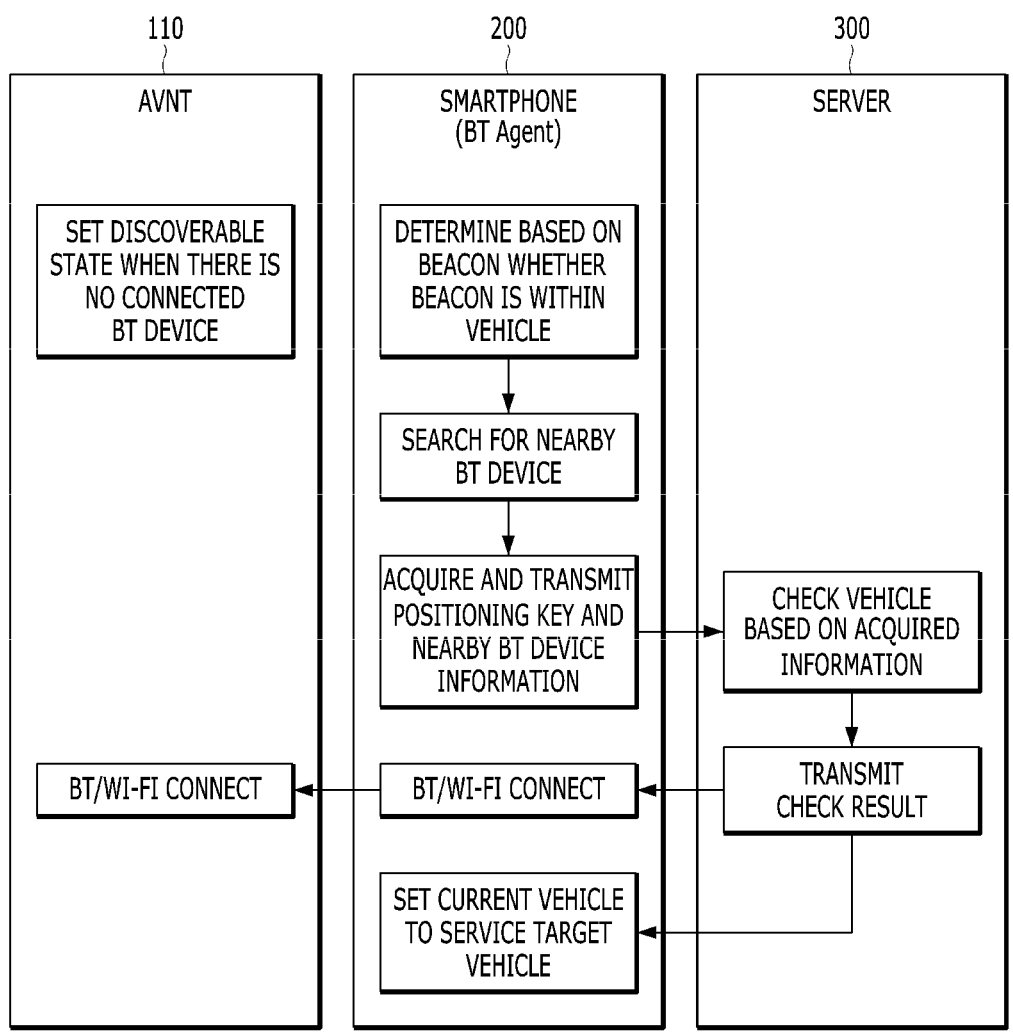
FIG. 2 is a diagram showing an example of a function of each component of a vehicular wireless connection system according to an exemplary embodiment of the present invention.

First, a configuration of a system according to the present exemplary embodiment will be described with reference to both FIGS. 1 and 2. FIG. 1 is a schematic diagram showing a configuration of a vehicular wireless connection system according to an exemplary embodiment of the present invention. FIG. 2 is a diagram showing an example of a function of each component of a vehicular wireless connection system according to an exemplary embodiment of the present invention.

Referring to both FIGS. 1 and 2, the vehicular wireless connection system according to an exemplary embodiment may include a vehicle 100, a smart device 200, and a server 300. The vehicle 100 may include an audio/video/navigation (AVN) system 110 (or audio/video/navigation terminal (AVNT)) including at least one of wireless communication modules, e.g., a Bluetooth (BT) or Wi-Fi module, and a plurality of beacons 121, 122, 123, and 124.

When the AVN system 110 has no Bluetooth device connected thereto, the AVN system 110 may be configured to set the Bluetooth module in a discoverable state (i.e., discoverable) and expose the Bluetooth module to another nearby Bluetooth device, e.g., the smart device 200. Particularly, although FIG. 1 illustrates a plurality of beacons 121, 122, 123, and 124 corresponding to a front left (FL) beacon 121, a front right (FR) beacon 122, a rear left (RL) beacon 123, and a rear right (RR) beacon 124 of a vehicle and are configured in a total number of 4, this is exemplary, and a larger or smaller number of beacons may be implemented in an actual exemplary embodiment.

Each of the beacons 121, 122, 123, and 124 may be configured to advertise or broadcast a message having a predetermined protocol, and the smart device 200 may be configured to acquire unique identification information (e.g., MAC address) of each beacon through the message. In particular, the unique identification information of each beacon may satisfy a preset rule or may be a value within a pre-allocated range for each manufacturer. In addition, each beacon may support a positioning function defined according to the Bluetooth low energy (BLE) technology, but this is exemplary and the present invention is not limited thereto as long as a signal for determining whether the smart device 200 is positioned within a vehicle including the corresponding beacons is transmitted by the smart device 200.

The smart device 200 may include, for example, a smartphone, a smart tablet, or the like, but may not be limited to any particular form as along as the smart device 200 receives a signal of each of the beacons 121, 122, 123, and 124, is capable of being connected to the wireless communication module included in the AVN system 110, and is capable of communicating with the server 300. The smart device 2000 may include an agent having installed therein an application for supporting a service such as a telematics service, a connected car, or car-sharing, configured to receive a signal of each of the beacons 121, 122, 123, and 124 and the AVN system 110, and having logic for generating vehicle identification information based on the signal, as described below.

The vehicle identification information may include a positioning key generated base on a MAC address of each beacon, and identification information (e.g., a MAC address of a Bluetooth device) of a nearby wireless communication module detected to be in a discoverable state. The positioning key will be described below in more detail. For example, the agent may be a Bluetooth agent (BT agent) and may be embodied in the form of a hardware module, a software module, or an application, but is not limited thereto.

Further, the agent may be configured to transmit the vehicle identification information to the server 300, and the server 300 may acquire vehicle verification result information in response to the vehicle identification information. The vehicle verification result information may include identification information of a wireless communication module matching the positioning key, among nearby wireless communication modules contained in the vehicle identification information.

Needless to say, vehicle verification result information may also include identification information of another wireless communication module included in the corresponding vehicle even if the wireless communication module is not contained in the vehicle identification information. For example, even if only MAC information of the Bluetooth module of the AVN system 110 is contained in the vehicle identification information, the vehicle verification result information may also include MAC information of a Wi-Fi module included in the corresponding vehicle.

Based on the vehicle verification result information, the smart device 200 may be configured to automatically perform connection (e.g., BT pairing or Wi-Fi connection) with the wireless communication module corresponding to a vehicle in which a user is currently located, among nearby Bluetooth devices detected to be in a discoverable state.

When the vehicle verification result information further includes unique information for identifying a vehicle, the smart device 200 may be configured to automatically input corresponding information to an application that requires unique information, and set a position in which the smart device 200 is currently positioned, to a service target vehicle to specify the service target vehicle of a connected-car service, a car-sharing application, or the like.

The server 300 may be configured to manage information by matching a positioning key value for each vehicle of a corresponding vehicle manufacturer with identification information of the wireless communication module. In response to receiving the vehicle identification information from the smart device 200, the server 300 may be configured to verify the identification information of the wireless communication module corresponding to the positioning key value based on the managed information and provide the vehicle verification result information to the smart device 200.

Figure 3:
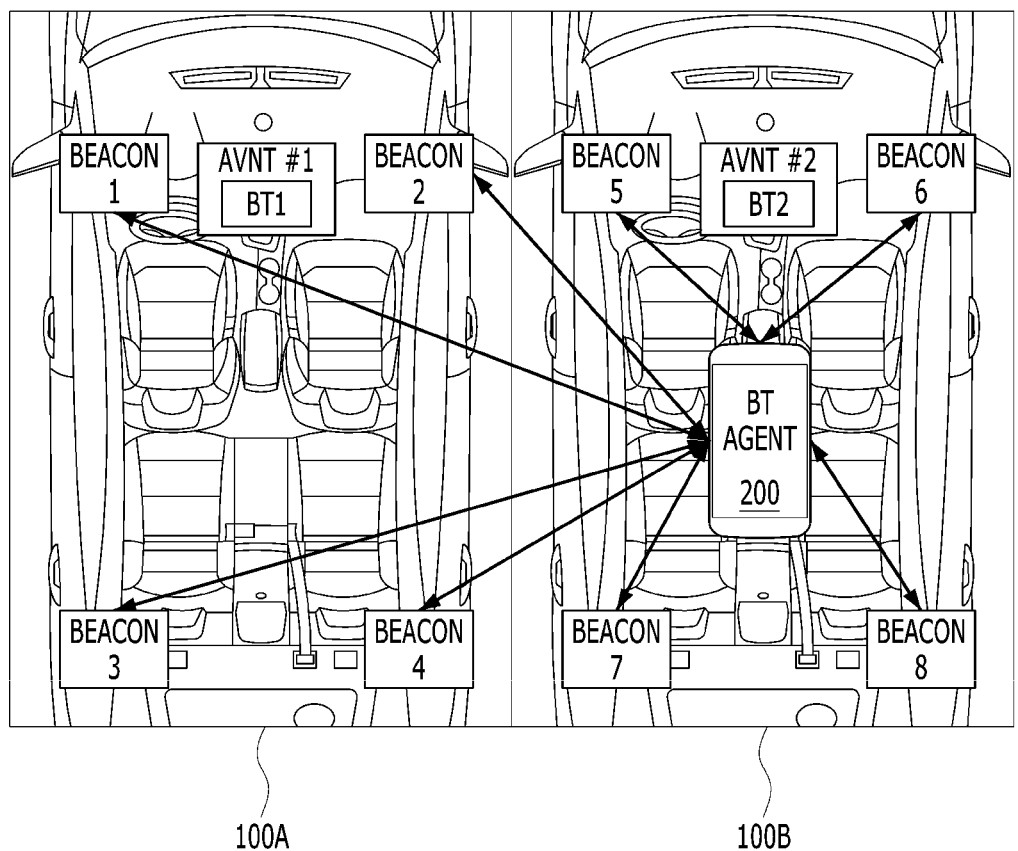
FIG. 3 is a diagram for explanation of a case in which a smart device of a wireless connection system determines whether the smart device is positioned within a vehicle by the smart device according to an exemplary embodiment of the present invention.

Hereinafter, determination of whether a smart device is positioned within a vehicle using a beacon and generation of a positioning key will be described with reference to FIG. 3. FIG. 3 is a diagram for explanation of a case in which a smart device of a wireless connection system determines whether the smart device is positioned within a vehicle by the smart device according to an exemplary embodiment of the present invention.

Referring to FIG. 3, when two vehicles 100A and 100B each including a beacon and an AVN system according to an exemplary embodiment are parked adjacent to each other, a user carrying or possessing the smart device 200 may be located in a vehicle on the right 100B and may attempt connection of the smart device 200. It may be assumed that AVN systems AVNT #1 and AVNT #2 of the respective vehicles are discoverable since there is no connected Bluetooth device, beacons of the vehicles 100A and 100B satisfy a predetermined MAC address condition, and a signal is advertised based on a BLE profile.

Particularly, a BT agent of the smart device 200 may be configured to receive a signal from all of beacons 1 to 4 of a vehicle on the left 100A and beacons 5 to 8 of the vehicle on the right 100B. The BT agent that receives the signal may be configured to determine that the beacons 1 to 4 are relatively far from the BT agent and are positioned in the same direction based on the smart device 200, and thus may be configured to determine that the smart device 200 is not positioned within the corresponding vehicle on the left 100A via a BLE-based positioning logic. When the beacons 5 to 8 are within a predetermined distance (e.g., about 1.5 meters) in which the BT agent is generally detected to be within the vehicle and are positioned in different directions, the smart device 200 may be determined to be positioned within the vehicle on the right 100B in which the beacons are installed.

In other words, the BT agent may be configured to determine respective directions and distances of the plurality of beacons that transmit the corresponding beacon signals based on a plurality of beacon signals, and thereamong, determine that a preset number of beacons that satisfy a specific condition (here, 4) are installed within a vehicle in which a BT agent is present. Particularly, the specific condition may correspond to a distance and a direction, that is, whether beacons are within a predetermined distance and are positioned in different directions, and may use a MAC address value (e.g., whether at least one specific cipher is the same) as a reference.

Additionally, the BT agent may be configured to perform filtering for primarily excluding a corresponding signal from a determination target prior to positioning determination when a MAC address of a beacon signal does not satisfy a predetermined range or rule among a plurality of beacons that are currently received by the BT agent. In response to determining that the BT agent is positioned within the vehicle, the BT agent may be configured to search for a nearby BT device in a discoverable state, acquire the MAC address of at least one discovered BT device, and generate a positioning key based on the MAC address of the beacon signal.

A positioning key may be generated by a combination of respective MAC addresses of a plurality of beacons according to a predetermined rule, or may also be achieved by further performing an encryption procedure. For example, the predetermined rule may be formed by sequentially listing the last three ciphers of each of four MAC addresses, by summing each MAC address, or by obtaining the result of an XOR operation on each MAC address, but this is exemplary and the predetermined rule is not limited to any particular generation method, as long as the rule is predetermined on the server 300. The positioning key and the MAC address of the discovered BT device may be transmitted in the form of vehicle identification information to the server 300.

Figure 4:
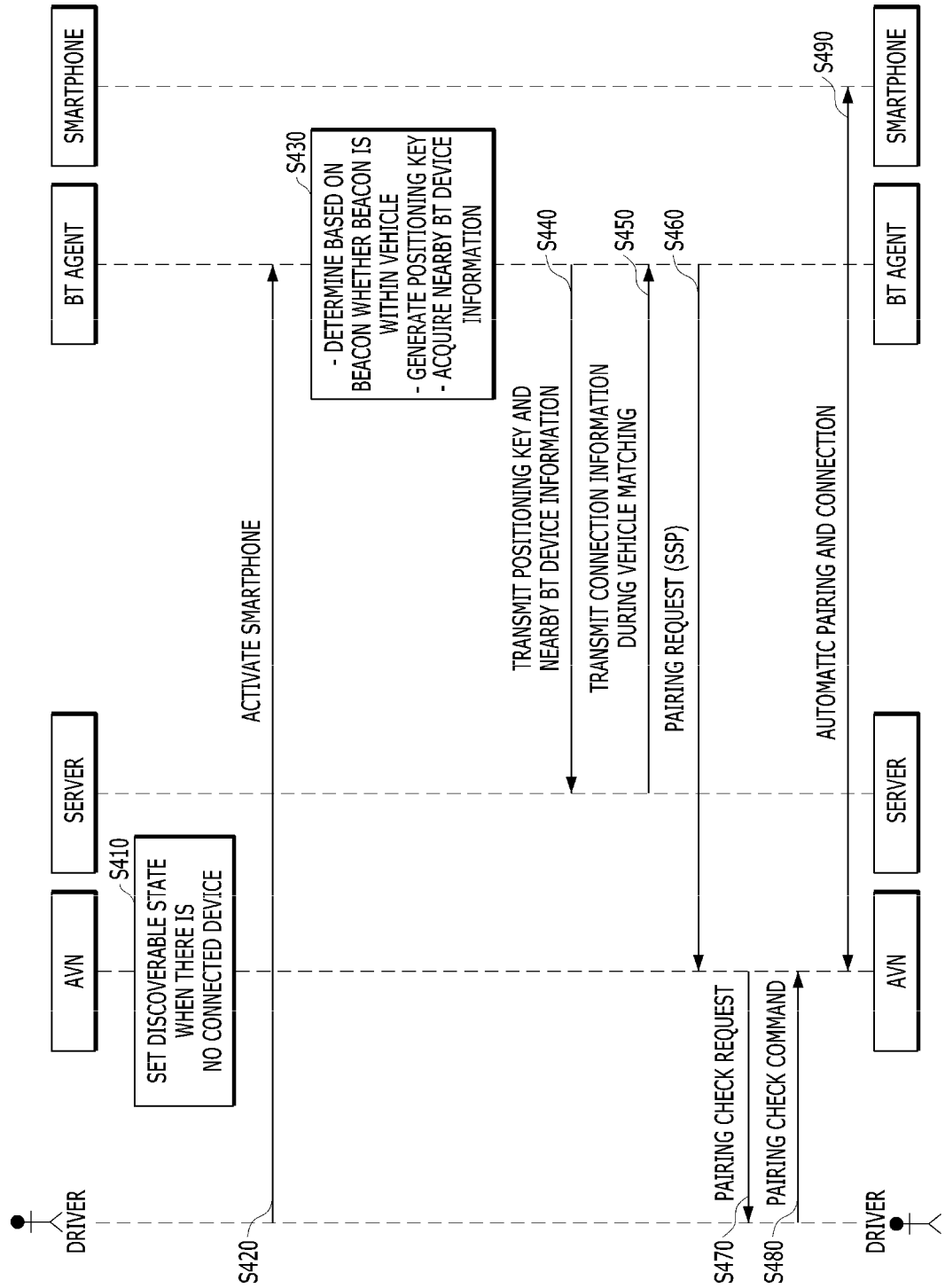
FIG. 4 is a flowchart showing an example of a procedure of performing connection between a vehicle and a smart device in a wireless connection system according to an exemplary embodiment of the present invention.

Hereinafter, a wireless connection procedure of the vehicular wireless connection system that has been described thus far will be described with reference to a flowchart of FIG. 4. FIG. 4 is a flowchart showing an example of a procedure of performing connection between a vehicle and a smart device in a wireless connection system according to an exemplary embodiment of the present invention. In FIG. 4, it is noted that a smart device is assumed to be a smartphone and that a BT agent is installed in the smartphone but is separately displayed therefrom to distinguish the BT agent from a function of a general smartphone.

Referring to FIG. 4, an AVN system of a vehicle may be configured to set a BT module in a discoverable state when there is no connected BT device (S410). In this state, a driver may activate an automatic connection function of a smart device (S420). In particular, activation of the automatic connection function may refer to execution of a specific application related to a BT agent but is not limited thereto.

Accordingly, the BT agent may be configured to determine whether the BT agent is positioned within the vehicle based on a beacon signal, generate a positioning key based on the corresponding beacon signal in response to determining that the BT agent is positioned within the vehicle, and acquire information (i.e., a MAC address) regarding a nearby BT device (S430). The BT agent may be configured to transmit vehicle identification information, including information regarding the positioning key and a nearby device, to a server (S440).

The server may be configured to identify a vehicle in which a smartphone is positioned based on the vehicle identification information, and when there is a BT device matching the positioning key, the server may be configured to transmit vehicle verification result information, including connectable device information of a vehicle including the corresponding BT device (i.e., AVN system), to a smartphone (S450). Particularly, the vehicle verification result information may further include identification information (e.g., a vehicle number, a vehicle type, or a manufacturer) of the vehicle. The BT agent may be configured to transmit a request to the AVN system of the corresponding vehicle for pairing using connectable device information included in the received vehicle verification result information (S460). The pairing request may be a secure simple pairing (SSP) method but is not limited thereto.

The AVN system may be configured to output a prompt to a driver to determine whether to accept the pairing request (e.g., display of a pop-up window) (S470). When the driver inputs a command indicating acceptance of pairing (S480), the AVN system and the smartphone may be configured to automatically perform BT connection via pairing (S490). When the vehicle verification result information includes connection information (e.g., a Wi-Fi MAC address installed in the corresponding vehicle) of another wireless communication module, the smartphone may also be configured to perform additional automatic connection using the corresponding connection information.

Figure 5:
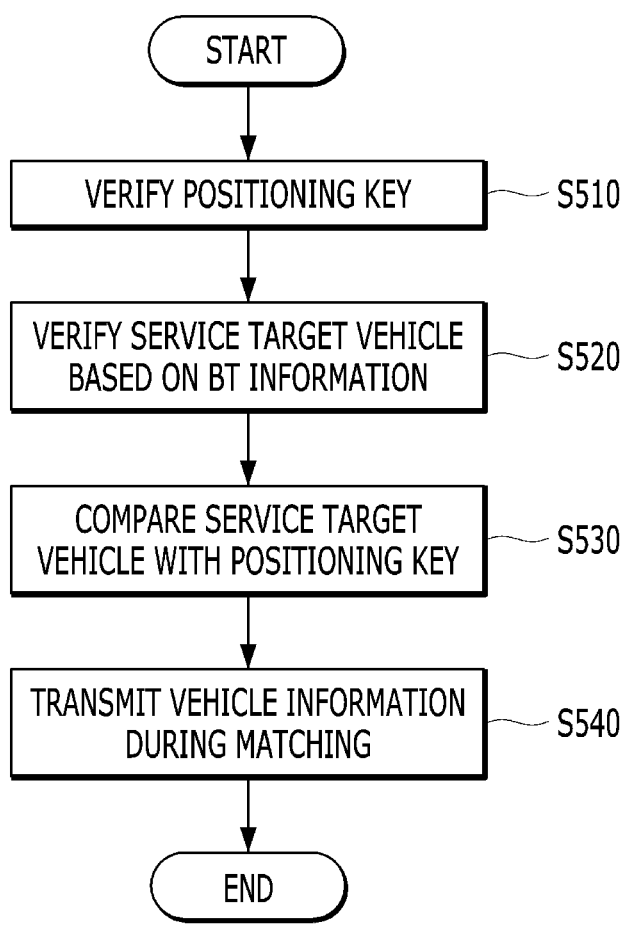
FIG. 5 is a flowchart showing an example of a procedure of performing vehicle verification by a server in a wireless connection system according to an exemplary embodiment of the present invention.

Hereinafter, a procedure of processing vehicle identification information of a server will be described in more detail with reference to FIG. 5. FIG. 5 is a flowchart showing an example of a procedure of performing vehicle verification by a server in a wireless connection system according to an exemplary embodiment of the present invention.

Referring to FIG. 5, the server may be configured to verify a positioning key based on whether a positioning key contained in the vehicle identification information matches a pre-managed positioning key (S510). When verification is successful, based on whether BT information corresponding to a service target vehicle that is currently managed by a server is present in nearby BT information (i.e., a MAC address) contained in the vehicle identification information, whether a vehicle in which a smartphone is positioned is the service target vehicle may be verified (S520).

Further, the server may be configured to compare the service target vehicle and the positioning key to determine whether the service target vehicle and the positioning key are related to the same vehicle (S530), and in the same vehicle, the corresponding vehicle information may be transmitted as vehicle verification result information to the smartphone (S540). As described above, the vehicle verification result information may include vehicle identification information and connection information of a wireless communication device capable of being connected to the corresponding vehicle.

Through the vehicular wireless connection system according to exemplary embodiments of the present invention that has been described thus far, a driver does not need to manually input separate vehicle information during use of an in-vehicle connected application, and wireless connection may also be automatically performed, thereby achieving convenience.

A smart device may be conveniently connected to a vehicle through the vehicular wireless connection system related to at least one exemplary embodiment of the present invention configured as described above. In particular, a smart device may determine whether the smart device is positioned within a vehicle, may autonomously acquire surrounding wireless environment information, and may transmit a request to a server for vehicle verification, whereby a user does not need to directly input vehicle information, thereby achieving convenience.

It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a non-transitory computer readable recording medium. The non-transitory computer readable recording medium is any data storage device that can store data which can thereafter be read by a computer. Examples of the non-transitory computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations may be made in the present invention without departing from the spirit or scope of the inventions. Thus, it is intended that the present invention cover the modifications and variations of this invention provided they come within the scope of the appended claims and their equivalents.

What is claimed is:

1. A wireless connection method of a smart device, comprising:
   receiving, by a controller of the smart device, a plurality of beacon signals;
   generating, by the controller, a positioning key based on at combination of at least some of the plurality of beacon signals;
   transmitting, by the controller, identification information including the positioning key and identification information of at least one nearby wireless device, to a server;
   in response to receiving vehicle verification result information from the server, attempting, by the controller, a wireless connection to the vehicle based on the vehicle verification result information;
   determining, by the controller, at least one of a direction or a distance of each of a plurality of beacons configured to transmit the plurality of beacon signals, respectively; and
   determining, by the controller, a preset number of beacons belonging to the vehicle based on at least one of the determined direction or distance.

2. The method of claim 1, wherein the positioning key is generated based on unique identification information of each of the preset number of beacons belonging to the vehicle among the plurality of beacons.

3. The method of claim 1, further comprising:
   determining, by the controller, whether unique identification information of each of a plurality of beacons, satisfies a preset rule; and
   determining, by the controller, whether one of the plurality of beacons satisfying the preset rule is positioned within the vehicle based on a beacon signal of the one beacon among the plurality of beacons.

4. The method of claim 1, wherein the beacon signal includes a Bluetooth low energy (BLE)-based beacon signal and the identification information of the at least one nearby wireless device includes a Bluetooth MAC address.

5. The method of claim 1, wherein transmitting vehicle verification result information includes:
   transmitting, by the controller, the vehicle verification result information including information regarding a vehicle corresponding to the identification information of the determined wireless device, to the smart device, when the identification information of the determined wireless device matches the positioning key.

6. A non-transitory computer readable recording medium having recorded thereon a program for executing the method of claim 1.

7. A method of supporting wireless communication connection between a smart device and a vehicle including a preset number of beacons, by a server, the method comprising:
   receiving, by a controller, vehicle identification information including a positioning key generated based on a signal transmitted by each of the beacons and identification information of at least one wireless device, from the smart device;
   verifying, by the controller, the vehicle based on the positioning key and the identification information of the at least one wireless device; and
   transmitting, by the controller, vehicle verification result information as a result of the verifying to the smart device,
   wherein verifying the vehicle includes:
   comparing, by the controller, the positioning key with pre-retained positioning key information;
   when the positioning key is present in the pre-retained positioning key information, determining, by the controller, whether wireless device identification information corresponding to a service target vehicle is detected in the identification information of the at least one wireless device; and
   determining, by the controller, whether the identification information of the wireless device determined to correspond to the service target vehicle matches the positioning key.

8. The method of claim 7, wherein the vehicle verification result information includes a MAC address of each of at least one connectable wireless communication module of a vehicle corresponding to the identification information of the determined wireless device.

9. A vehicular wireless communication connection system, comprising:
   a vehicle including a preset number of beacons and at least one wireless communication module; and
   a smart device configured to attempt a wireless connection to the vehicle using a plurality of beacon signals and wireless device identification information received from the at least one wireless communication module,
   wherein the smart device is configured to generate a positioning key based on a combination of at least some of the plurality of beacon signals and transmit identification information of at least one nearby wireless device, to a server, and in response to receiving vehicle verification result information from the server, the smart device is configured to attempt the wireless connection to the vehicle based on the vehicle verification result information, and
   wherein the smart device is configured to determine at least one of a direction or a distance of each of a plurality of beacons configured to transmit the plurality of beacon signals, respectively, and determine a preset number of beacons belonging to the vehicle based on at least one of the determined direction or distance.

10. The vehicular wireless communication connection system of claim 9, wherein the smart device is configured to generate the positioning key based on unique identification information of each of the preset number of beacons belonging to the vehicle among the plurality of beacons.

11. The vehicular wireless communication connection system of claim 9, wherein the smart device is configured to determine whether one of the plurality of beacons satisfying a preset rule is positioned within the vehicle based on a beacon signal of the one beacon among the plurality of beacons.

12. The vehicular wireless communication connection system of claim 9, wherein the beacon signal includes a Bluetooth low energy (BLE)-based beacon signal and the identification information of the nearby wireless device includes a Bluetooth MAC address.

* * * * *